3,520,914
HYDROFORMYLATION OF 2-ALKENENITRILES TO 2-HYDROXYMETHYLALKANENITRILES
Donald G. Kuper, Bartlesville, Okla., assignor to Phillips Petroleum Company, a corporation of Delaware
No Drawing. Filed Oct. 23, 1967, Ser. No. 677,034
Int. Cl. C07c *121/34*
U.S. Cl. 260—465.6             6 Claims

ABSTRACT OF THE DISCLOSURE

Acrylonitrile and its alkyl-substituted derivatives (2-alkenenitriles) are hydroformylated in a liquid reaction mixture including an acid (such as acetic acid), a non-polar diluent (such as a hydrocarbon), a hydroformylation catalyst (such as $Rh_2O_3$), CO, and $H_2$ to yield the corresponding 2-hydroxymethylalkanenitriles.

---

This invention is concerned with a novel method of preparing 2-hydroxymethylalkanenitriles from 2-alkenenitriles by hydroformylation.

Nitriles are compounds recognized in the art as having value in different applications such as avicides, insecticides, rodenticides, and the like. 2-methyl-2-propenenitrile (alpha-methylvinylcyanide, methacrylonitrile) can be prepared from 2-methyl - 3 - hydroxypropanenitrile (alpha-methyl-beta-hydroxyethylcyanide) and, of course, methacrylonitrile is well known as a monomer useful in the synthesis of vinyl polymers which have application as adhesives, coatings, films, and the like. In subjecting acrylonitrile to hydroformylation in the presence of a catalyst, CO, and $H_2$, the hydroformylation is usually effected on the beta (3) carbon atom rather than on the alpha (2) carbon atom. Applicant has found a method by which the hydroformylation is effected on the alpha (2) carbon atom.

Accordingly, the principal object of the invention is to provide a process for hydroformylating 2-alkenenitriles (acrylonitriles) to 2-(hydroxymethyl)alkanenitriles (3-hydroxypropanenitriles). Another object is to provide a process for effecting hydroformylation of 2-alkenenitriles which results in hydroformylation on the alpha (2) rather than the beta (3) carbon atom of the 2-alkenenitrile. Other objects of the invention will become apparent to one skilled in the art upon consideration of the accompanying disclosure.

In accordance with a broad aspect of the invention, acrylonitriles (including alkyl-substituted derivatives thereof) e.g., 2-alkenenitriles, are hydroformylated in a liquid reaction mixture including an acid, a non-polar diluent, a hydroformylation catalyst, CO, and $H_2$, at elevated temperatures and pressures to yield the corresponding 2-(hydroxymethyl)alkanenitriles.

To illustrate, acrylonitrile is reacted with CO and $H_2$ in the presence of pentane, $Rh_2O_3$, and acetic acid to yield 2-methyl-3-hydroxypropanenitrile (2 - [hydroxymethyl] propanenitrile).

The conversion reaction of this invention can be presented as follows:

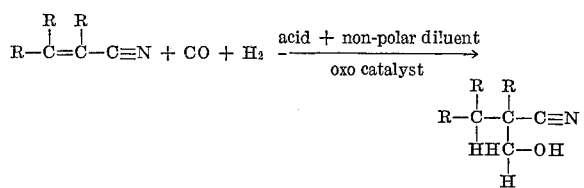

wherein R is hydrogen or an alkyl radical containing up to and including 10 carbon atoms per alkyl radical, provided that all R radicals per molecule of acrylonitrile compound contain no more than a total of 15 carbon atoms.

Some examples of compounds within the generic formula

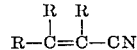

include:

2-propenenitrile (acrylonitrile)
2-methyl-2-propenenitrile (methacrylonitrile)
2-ethyl-2-propenenitrile
2-tridecenenitrile
2-butenenitrile
3-hexyl-2-nonenenitrile
2-ethyl-3-propyl-2-octenenitrile
3-pentyl-2-tridecenenitrile
2-decyl-2-propenenitrile and
2-(2-methyl)butyl-3-pentyl-6-methyl-2-heptenenitrile.

Some examples of compounds within the generic formula

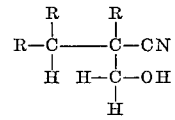

include:

2-methyl-3-hydroxypropanenitrile (2-methyl-3-hydroxypropionitrile)
2,2-dimethyl-3-hydroxypropanenitrile
2-ethyl-2-methyl-3-hydroxypropanenitrile
2-undecyl-3-hydroxypropanenitrile
2-(1-hexyl)heptyl-3-hydroxypropanenitrile
2-methyl-2-decyl-3-hydroxypropanenitrile
2-[2-methyl]butyl-2-[1-(3-methyl)butyl]hexyl-3-hydroxypropanenitrile
2-decyl-2-methyl-3-hydroxypropanenitrile and
2-(1-pentyl)-undecyl-3-hydroxypropanenitrile.

The hydroformylation reaction of the invention is effected at pressures in the range of about 600 p.s.i.g. to about 6000 p.s.i.g., preferably in the range of about 1200 p.s.i.g. to about 3000 p.s.i.g. Temperatures in the range of about 50 to about 300° C. are employed, temperatures in the range of about 100 to about 200° C. being preferred. Sufficient reaction time should be employed to effect the degree of conversion desired. Normally, reaction times in the range of about 5 minutes to about 12 hours are preferred. Carbon monoxide should be employed in a quantity at least molarly equivalent initially to the 2-alkenenitrile (acrylonitrile compound) charged. Small molar excesses of carbon monoxide are preferred. For example, the molar ratio of 2-alkenenitrile to carbon monoxide can vary from about 0.05 to about 1.0, the preferred ratio being in the range of about 0.1 to about 0.5. The molar ratio of carbon monoxide to hydrogen is in the range of about 0.5 to about 2. In general, however, molar ratios of carbon monoxide to hydrogen should be about 1.

To effect the hydroformylation conversion, a suitable non-polar diluent is employed. Suitable diluents are essentially non-polar in nature. In fact, any material normally liquid under the reaction environment employed that does not deleteriously affect the said hydroformylation conversion and that is essentially non-polar can be employed. Examples include pentane, hexane, cyclohexane, benzene, naphthalene, dodecane, octane, propane, ethane, xylene, toluene, and the like. Such diluents are employed in amounts in the range of about 10 to about 95 weight percent of the reactor contents.

A suitable hydroformylation catalyst (oxo catalyst) is also employed. Any conventional hydroformylation catalyst can be employed. Examples of such hydroformylation catalysts include $Co_2(CO)_8$, rhodium oxide, iridium oxide, ruthenium oxide, palladium chloride, and the like. Such catalysts are employed in amounts sufficient to effect the hydroformylation conversion within the time desired. Generally, such catalysts are employed in amounts in the range of about 0.001 to about 0.15 part of catalyst per part of 2-alkenenitrile charged.

A suitable acid is also employed. Any acid that does not deleteriously affect the above hydroformylation conversion is used. Examples of such acids include acetic acid, propionic acid, oxalic acid, citric acid, phosphoric acid, n-octanephosphonic acid, and the like. Such acids are employed in the range of about 0.01 to about 30 parts of acid per 100 parts of 2-alkenenitrile charged.

The 2-(hydroxymethyl)alkanenitrile products (3-hydroxypropanenitriles) of the process can be recovered by any means known to the art such as distillation, solvent extraction, and the like.

The 2-(hydroxymethyl)alkanenitriles produced by the process of the instant invention are useful compounds. For example, these materials can be oxygenated to dicarboxylic acids which are useful as polymer precursors, hydrogenated to amino alcohols, or converted to amino acids. The novel 2-(hydroxymethyl)alkanenitrile products are also biologically active and useful as rodenticides, avicides, and insecticides.

The value and operability of the process of the instant invention are demonstrated by the following example.

EXAMPLE I

To a stirred reactor were charged 15 g. acrylonitrile, 0.1 g. $Rh_2O_3$, 130 ml. of n-pentane, and 0.5 ml. of glacial acetic acid. The system was purged and pressured to 2900 p.s.i.g. with synthesis gas ($CO/H_2=1$). The reactor contents were heated to 127° C. and maintained at that temperature for about 1½ hours. Upon cooling, the reactor contents separated into two phases. A brownish colored lower layer (10.8 grams) was separated from the clear pentane upper layer. The lower layer was distilled to yield 4.5 g. of propanenitrile and 3.8 g. of 2-methyl - 3 - hydroxypropanenitrile. The 2-methyl-3-hydroxypropanenitrile had a boiling point of 68-72° C., 2 mm. Hg. Elemental composition calculated for the 2-methyl-3-hydroxypropanenitrile is: carbon, 57%; hydrogen, 8%; nitrogen, 16.5%. Elemental analyses determined the product to have 57% carbon, 8% hydrogen, 16.6% nitrogen. Infrared (IR) data were consistent with those expected for the structure of 2-methyl-3-hydroxypropanenitrile. NMR (nuclear magnetic resonance) evaluation further determined the product to be 2-methyl-3-hydroxypropanenitrile.

Examination of the products revealed no 4-hydroxybutanenitrile, or other hydroformylation products that might be predicted by prior art disclosure.

This example demonstrates that 2-methyl-3-hydroxypropanenitrile, a 2 - (hydroxymethyl)propanenitrile) is formed by the hydroformylation of acrylonitrile, a 2-alkenenitrile, in the presence of an acid, a non-polar diluent, and a hydroformylation catalyst. This is a totally unexpected result and a complete surprise to one familiar with the teachings of the art. Normally, if hydroformylation is effected at all, it is effected on the beta (3) carbon atom, according to the teachings of the art.

The hydroformylation process disclosed herein can be performed, either batchwise or continuously, in conventional apparatus familiar to those skilled in the art.

Certain modifications of the invention will become apparent to those skilled in the art and the illustrative details disclosed are not to be construed as imposing unnecessary limitations on the invention.

I claim:
1. A process for producing a 2-(hydroxymethyl) alkanenitrile which comprises reacting a compound of the formula

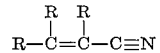

wherein R is hydrogen or an alkyl radical containing up to and including 10 carbon atoms and the sum of the carbon atoms in the alkyl radicals does not exceed 15, with CO and $H_2$ in admixture with an acid of acetic acid, propionic acid, oxalic acid, citric acid, phosphoric acid or n-octanephosphoric acid, a non-polar liquid diluent, and a hydroformylation catalyst consisting essentially of $Co_2(CO)_8$, rhodium oxide, iridium oxide, ruthenium oxide or palladium chloride at a temperature in the range of 50 to 300° C. and pressure in the range of 600 to 6000 p.s.i.g. to form said 2-(hydroxymethyl)alkanenitrile wherein said acid is in a concentration in the range of 0.01 to 30 parts per 100 parts of said compound.

2. The process of claim 1 wherein the molar ratio of said compound to CO is in the range of 0.05 to 1.0 and the molar ratio of CO to $H_2$ is in the range of 0.5 to 2.

3. The process of claim 1 wherein said diluent is a hydrocarbon in a concentration in the range of 10 to 95 weight percent of the reaction mixture.

4. The process of claim 1 wherein said catalyst is rhodium oxide.

5. The process of claim 1 wherein said catalyst is rhodium oxide, said acid is acetic, said diluent is a hydrocarbon in a concentration in the range of 1 to 95 weight percent of the reaction mixture, the molar ratio of said compound to CO is in the range of 0.05 to 1.0, and the molar ratio of CO to $H_2$ is in the range of 0.5 to 2.

6. The process of claim 1 wherein said compound is acrylonitrile, said catalyst is $Rh_2O_3$, said diluent is a normal paraffin hydrocarbon, said acid is acetic, the ratio of CO to $H_2$ is in the range of 0.5 to 2, the ratio of acrylonitrile to CO is in the range of 0.1 to 0.5, said temperature is in the range of 100 to 200° C., and said pressure is in the range of 1200 to 3000 p.s.i.g.

References Cited

UNITED STATES PATENTS

| | | | |
|---|---|---|---|
| 2,437,600 | 3/1948 | Gresham et al. | 260—465.6 XR |
| 3,337,603 | 8/1967 | Kato et al. | 260—465.6 XR |

JOSEPH P. BRUST, Primary Examiner